United States Patent [19]

Kurzeja et al.

[11] Patent Number: 4,605,384
[45] Date of Patent: Aug. 12, 1986

[54] SELF-ALIGNING TRIPOD JOINT TULIP COVER AND CONSTANT VELOCITY JOINT INCORPORATING SAME

[75] Inventors: Patrick L. Kurzeja, Comber, Canada; Noel W. Sutton, Northville, Mich.; Steven C. Hahn, Mt. Clemens, both of Mich.

[73] Assignee: GKN Automotive Components Incorporated, Southfield, Mich.

[21] Appl. No.: 589,994

[22] Filed: Mar. 14, 1984

[51] Int. Cl.4 .............................................. F16D 3/30
[52] U.S. Cl. .................................... 464/111; 464/905
[58] Field of Search ............... 464/111, 905, 169, 906; 464/175, 133

[56] References Cited

U.S. PATENT DOCUMENTS

| | | | |
|---|---|---|---|
| 1,987,678 | 1/1935 | Goddard et al. | 464/169 |
| 4,083,202 | 4/1978 | Westercamp | 464/905 X |
| 4,177,654 | 12/1979 | Aucktor | 464/906 |
| 4,196,598 | 4/1980 | Hirai et al. | 464/111 |
| 4,224,806 | 9/1980 | Kobayashi | 464/905 X |
| 4,280,340 | 7/1981 | Goguet | 464/905 X |
| 4,293,304 | 10/1981 | Sandströ464 | 906/ |
| 4,318,282 | 3/1982 | Orain | 464/111 |
| 4,320,632 | 3/1982 | Dore | 464/111 |
| 4,360,209 | 11/1982 | Ukai et al. | 464/111 |
| 4,403,781 | 9/1983 | Riemscheid | 464/175 |
| 4,493,676 | 1/1985 | Krude | 464/175 |
| 4,507,100 | 3/1985 | Dore et al. | 464/111 |

FOREIGN PATENT DOCUMENTS

1268917 6/1961 France ............................. 464/111

Primary Examiner—Stephen Marcus
Assistant Examiner—Leo J. Peters
Attorney, Agent, or Firm—Remy J. VanOphem

[57] ABSTRACT

A self-aligning tripod joint tulip cover for interconnecting an irregularly shaped non-circular tulip body and a shaft mounted spider assembly, as well as a closed tripod constant velocity joint incorporating the self-aligning tripod joint tulip cover, the tulip body, and the shaft mounted spider assembly. The self-aligning tripod joint tulip cover is provided with a first flange engageable with the outer surface of the irregularly shaped non-circular tulip body and a second flange engageable with a boot, the second flange being generally concentric with the first flange but having a substantially smaller maximum diameter. An inwardly oriented flange extends from the self-aligning tulip cover between the first and second flanges, the inwardly oriented flange being engageable with a flat front surface of the irregularly shaped non-circular tulip body to form a seal therebetween. The first flange is crimped for interconnection with the irregularly shaped non-circular tulip body.

24 Claims, 8 Drawing Figures

SELF-ALIGNING TRIPOD JOINT TULIP COVER AND CONSTANT VELOCITY JOINT INCORPORATING SAME

BACKGROUND OF THE INVENTION

The present invention is directed to a self-aligning tulip cover for interconnecting and aligning a spider assembly, a tulip body, and a boot, as well as a closed tripod constant velocity joint incorporating the self-aligning tripod joint tulip cover.

Closed tripod joints have been popular for use in half-shaft assemblies of front wheel drive motor vehicles. A tripod joint is commonly used because of its ability to transmit torque at a constant velocity, in addition to allowing the joint centerline to move in an axial direction. This joint centerline movement is primarily caused by the movement of the suspension system in jounce and rebound and the movement of the power train on its mounts.

In addition to transmitting torque and allowing joint centerline movement axially, the plunging joint characteristics of a tripod joint in a front wheel drive vehicle also enable the tripod joint to act as an isolator for vibrations. These vibrations are generated by the power train due to its inherent unbalance and have to be isolated from the suspension system in order to eliminate any noticeable disturbances to the vehicle occupants.

The cover of a closed tripod joint has, in the past, been used to retain the tripod assembly inside the tulip body during operation. Prior art designs exist where a convoluted cover is assembled to the tulip body in such a manner that the convolutes of the cover fit on the irregular contours of the tulip forging. This results in an expensive tripod joint as well as one which may be difficult to assemble. Furthermore, the sealing boot may have to be lobed in these prior art designs to conform to the irregular contour of the tulip body, increasing the expense of manufacturing the boot and assembling it to the closed tripod joint.

Additionally, in prior art designs, the boot generally has an outer diameter greater than the respective outer diameters of the tulip body and the tulip cover. Thus, when the tripod joint is layed down or dropped, the boot experiences the load and impact, very likely resulting in a certain amount of boot damage during handling in assembly plants.

Another consideration in the design of closed tripod joints is that it is paramount for the proper lubrication and function of the closed tripod joint that an airtight seal exists between the sealing cover and the tripod body. Typically, this sealing has been achieved in the past by interconnection of one end of the boot to the outer surface of the tulip body or to the outer surface of a sealing cover mounted coaxially with the tulip body.

Several examples of prior art closed tripod joints, as well as tulip covers and boots therefor, may be found in Goguet, U.S. Pat. No. 4,280,340 issued July 28, 1981; Westercamp, U.S. Pat. No. 4,083,202 issued Apr. 11, 1978; Dore, U.S. Pat. No. 4,320,632 issued Mar. 23, 1983; Kobayashi, U.S. Pat. No. 4,224,806 issued Sept. 30, 1980; and Hirai, et al., U.S. Pat. No. 4,196,598 issued Apr. 8, 1980.

What is needed, therefore, is an inexpensive tripod joint tulip cover which is self-aligning and provides a good seal with the tulip body. Furthermore, what is needed is such a tripod joint tulip cover which is easily interconnected with a boot having a regular circular contour. Additionally, what is needed is a tripod joint tulip cover which permits the interconnection thereto of a boot having a smaller outer diameter than the respective outer diameters of the tulip cover and tulip body so as to protect the boot from damage during assembly and handling.

SUMMARY OF THE PRESENT INVENTION

The present invention provides a self-aligning tripod joint tulip cover for interconnecting an irregularly shaped non-circular tulip body, a shaft mounted spider assembly, and a boot, as well as the closed tripod constant velocity joint incorporating the self-aligning tripod joint tulip cover, the irregularly shaped non-circular tulip body, the shaft mounted spider assembly, and the boot.

The self-aligning tulip cover of the present invention is provided with a first flange, preferably cylindrically shaped, for selectively engaging the irregularly shaped non-circular outer circumferential surface of the tulip body. The first flange is selectively interconnected with the outer irregularly shaped non-circular circumferential surface of the tulip body by crimping. A second flange, also preferably cylindrically shaped, is selectively interconnected with one end of the boot such as to form a seal therebetween. A generally radially extending inwardly oriented flange is provided between the first and second cylindrical flanges. The generally radially extending flange is provided with a member that selectively engageable with the annular end surface of the irregularly shaped non-circular tulip body such as to form a seal therebetween when the first flange is interconnected with the outer circumferential surface of the tulip body. The generally radially extending flange is provided with tabs that extend angularly and arcuately away from the generally radially extending flange to be engageable with the rollers of the spider assembly such as to retain the spider assembly in a preselected aligned orientation within the tulip body.

In the preferred embodiment, the tulip body has a plurality of partial circular cylindrical surface portions and a plurality of concave surface portions interposed the plurality of partial circular cylindrical surface portions. Each partial circular cylindrical surface portion is provided with a partial annular groove. The first flange is cylindrically shaped and engages each of the partial circular cylindrical surface portions. The means for interconnecting the first flange with the tulip body consists of a portion of the first flange which is selectively deflectable into engagement with the partial annular grooves. Further interconnection may be provided by crimping a portion of the first flange into engagement with a portion of each of the plurality of concave surface portions.

The sealing means preferably includes a flat resilient seal member which is compressed between the third flange and the tulip body, when the first flange is interconnected with the tulip body such as to provide a reliable seal therebetween. The second flange preferably includes a cylindrical flange axially aligned with the first flange but having a substantially smaller outer diameter than the first flange.

A principal object of the present invention is to provide a tulip cover for a closed tripod joint which is self-aligning. The present invention accomplishes this object by providing portions of the generally radially extending flange engageable with the rollers of the spider assembly to align the tulip cover during assembly to the tulip body.

Another object of the present invention is to provide a reliable seal between a tulip cover and a tulip body with a closed tripod joint. This object is accomplished by providing a tulip cover with a first flange engageable with the outer circumferential surface of the tulip body, a generally radially extending flange engageable with an end surface of the tulip body, and a seal interposed the third flange and the tulip body.

Another object of the present invention is to provide a closed tripod constant velocity joint which is inexpensive to manufacture. This object is accomplished by the provision of the self-aligning tripod joint tulip cover, summarized above, which is both inexpensive to manufacture and easy to assemble to a tulip body. This object is further accomplished by the provision of a cylindrical second flange of a smaller outer diameter than the outer diameter of the tulip body, such as to permit the use of an inexpensive and reduced diameter boot.

Yet another object of the present invention is to provide a closed tripod constant velocity joint of a type wherein the boot is not easily damaged during handling. This object is accomplished by use of a boot having a substantially smaller outer diameter than the maximum respective outer diameters of the tulip body and the tulip cover, so as to protect the boot from damage when the closed tripod constant velocity joint is layed down or dropped.

The many other objects, features, and advantages of the present invention will become apparent to those skilled in the art when the following detailed description of the preferred embodiment is read in conjunction with the drawings appended hereto.

DETAILED DESCRIPTION OF THE PREFERRED EMBODIMENT

Figures 1, 2, 3, 4:
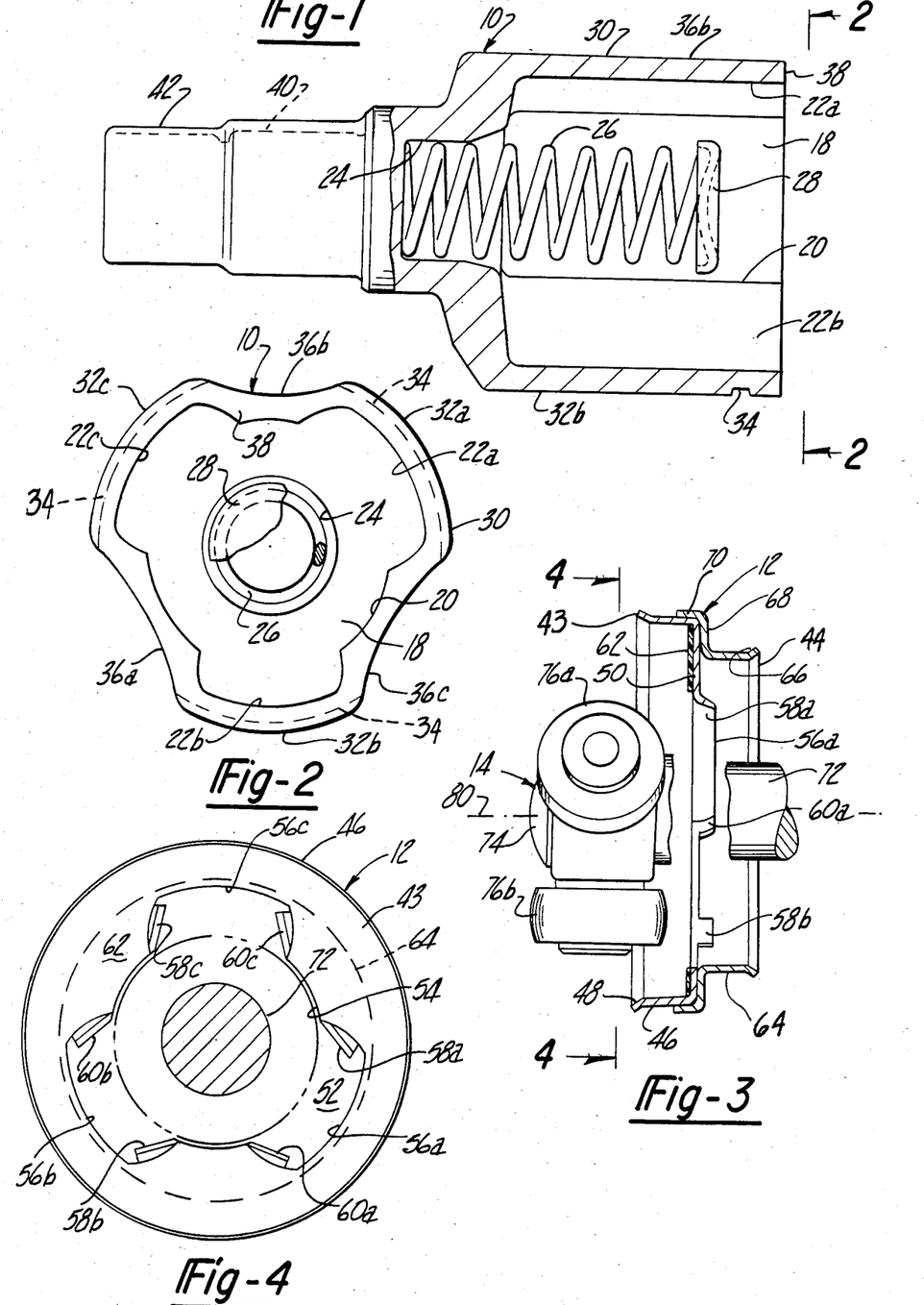
FIG. 1 is a partially cutaway side elevational view of a tulip body according to the present invention.
FIG. 2 is an end view of the tulip body of FIG. 1 taken along line 2—2 of FIG. 1.
FIG. 3 is a side elevational view of a spider assembly and a tulip cover according to the present invention.
FIG. 4 is a view taken along line 4—4 of FIG. 3 illustrating certain details of the tulip cover thereof.

Referring now to the drawings an example of a self-aligning tripod joint tulip cover and a closed tripod constant velocity joint according to the present invention are illustrated. In particular, FIGS. 1 and 2 illustrate the tulip body 10 and FIGS. 3 and 4 illustrate the tulip cover 12 and the spider assembly 14 prior to assembly of these components. FIGS. 5 through 8 illustrate an assembled closed tripod constant velocity joint 16 according to the present invention constructed from the tulip body 10, the tulip cover 12, and the spider assembly 14.

Referring now to FIGS. 1 and 2, the tulip body 10 is shown in detail. The tulip body 10 is an elongated forging having a longitudinal cavity 18 formed at one end. The longitudinal cavity 18, as best shown in FIG. 2, includes a cylindrical bore 20 surrounded by three tracks 22a, 22b, and 22c, each extending radially outwardly from the cylindrical bore 20 and extending generally in a longitudinal direction, relative to the tulip body 10. The longitudinal cavity 18 is further provided with a reduced diameter bore 24 coaxial with the cylindrical bore 20. A coil spring 26 extends coaxially from the reduced diameter bore 24 into the cylindrical bore 20. A spring cup 28 is mounted on the free end of the coil spring 26.

The tulip body 10 is further provided with an irregularly shaped outer surface 30. The outer surface 30 consists of three partial circular cylindrical surface portions 32a, 32b, and 32c, equally spaced about the outer surface, each of the partial circular cylindrical surface portions being concentric with the cylindrical bore 20 and aligned with a respective one of the three tracks 22a, 22b, and 22c. Each of the partial circular cylindrical surface portions 32a, 32b, and 32c is provided with a partial annular recess 34.

The outer surface 30 is further provided with three concave surface portions 36a, 36b, and 36c, disposed between adjacent pairs of the partial cylindrical surface portions 32a, 32b, and 32c. A flat irregularly shaped annular surface 38 is formed between the outer surface 30 of the tulip body 10 and the longitudinal cavity 18 thereof.

Finally, the tulip body 10 is provided, as best shown in FIG. 1, with a shaft portion 40 extending coaxially with the cylindrical bore 20 in a direction opposite the cylindrical bore. A protector 42 is removably mounted on the shaft portion 40 of the tulip body 10 to protect the shaft portion 40 from damage during the handling and assembly of the tulip body 10.

Referring now to FIGS. 3 and 4, the tulip cover 12 of the present invention is constructed from an inner member or tulip seal member 43 and an outer member or boot seal member 44. In the example illustrated, both the tulip seal member 43 and the boot seal member 44 are sheet metal stampings.

The tulip seal member 43 is provided with a first cylindrical flange 46 having a outwardly flared end 48, best shown in FIG. 3. An inwardly oriented generally radial flange 50 extends from a portion of the first cylindrical flange 46 remote from the outwardly flared end 48. The inwardly oriented flange 50, shown in FIG. 3, is provided with a central aperture 52, as shown in FIG. 4, including a circular portion 54 of approximately the same diameter as the cylindrical bore 20 of the tulip body 10 described above. Additionally, as best shown in FIG. 4, the central aperture 52 is provided with three cutaway portions or lobes 56a, 56b, and 56c, each corresponding approximately to the cross-sectional shape of the three tracks 22a, 22b, and 22c of the tulip body 10. Tabs 58a and 60a are formed from the inwardly oriented flange 50 on either side of the cutaway portions 56a and 56b. The tabs 58a and 60a extend angularly and arcuately away from the generally radially extending flange 50 in a direction opposite that of the first cylindrical flange 46. The tabs 58a and 60a are provided for selective engagement with a roller of the spider assembly 14, in a manner to be described later herein. Similar tabs 58b and 60b and 58c and 60c, respectively, are provided adjacent the lobes 56b and 56c for engagement with additional rollers of the spider assembly.

A resilient seal member 62 is mounted to the surface of the generally radially extending flange 50 which is nearest the first cylindrical flange 46. The resilient seal member 62 is flat and generally has the shape of the inwardly oriented flange 50.

The boot seal member 44 of the tulip cover 12, best illustrated in FIG. 3, is provided with a second cylindrical flange 64. The second cylindrical flange 64 is axially aligned with the first cylindrical flange 46 of the tulip seal member 43 but has a substantially reduced diameter as compared with the first cylindrical flange. The second cylindrical flange 64 is provided with an outwardly flared end 66. An outwardly oriented flange 68 extends from the end of the second cylindrical flange 64 remote from the outwardly flared end 66. The outwardly oriented flange 68 abuts a surface of the generally radially extending flange 50 of the tulip seal member 43. A third cylindrical flange 70 extends from the outwardly oriented flange 68 in a direction opposite the second cylindrical flange 64, such as to engage a portion of the outer surface of the first cylindrical flange 46 of the tulip seal member 43. The outwardly oriented flange 68 and the third cylindrical flange 70 of the boot seal member 44 are interconnected in an appropriate manner, such as brazing, with the inwardly oriented flange 50 and the first cylindrical flange 46 of the tulip seal member 43 so as to form a unitary tulip cover 12.

As shown in FIG. 3, the spider assembly 14 consists of a shaft 72 having a partial spherical portion 74 formed at one end. Three rollers, of which two rollers 76a and 76b are shown, are rotatably mounted to the shaft 72 adjacent the partial spherical portion 74, such as to rotate about three equally spaced axes perpendicular to the longitudinal axis 80 of the shaft 72. The shaft 72 is provided with a reduced diameter portion 78, illustrated in FIG. 6, disposed remote from the partial spherical portion 74, for a purpose to be described later. The spider assembly 14 is well known in the art and is, therefore, not described or illustrated in detail greater herein.

Figure 5:
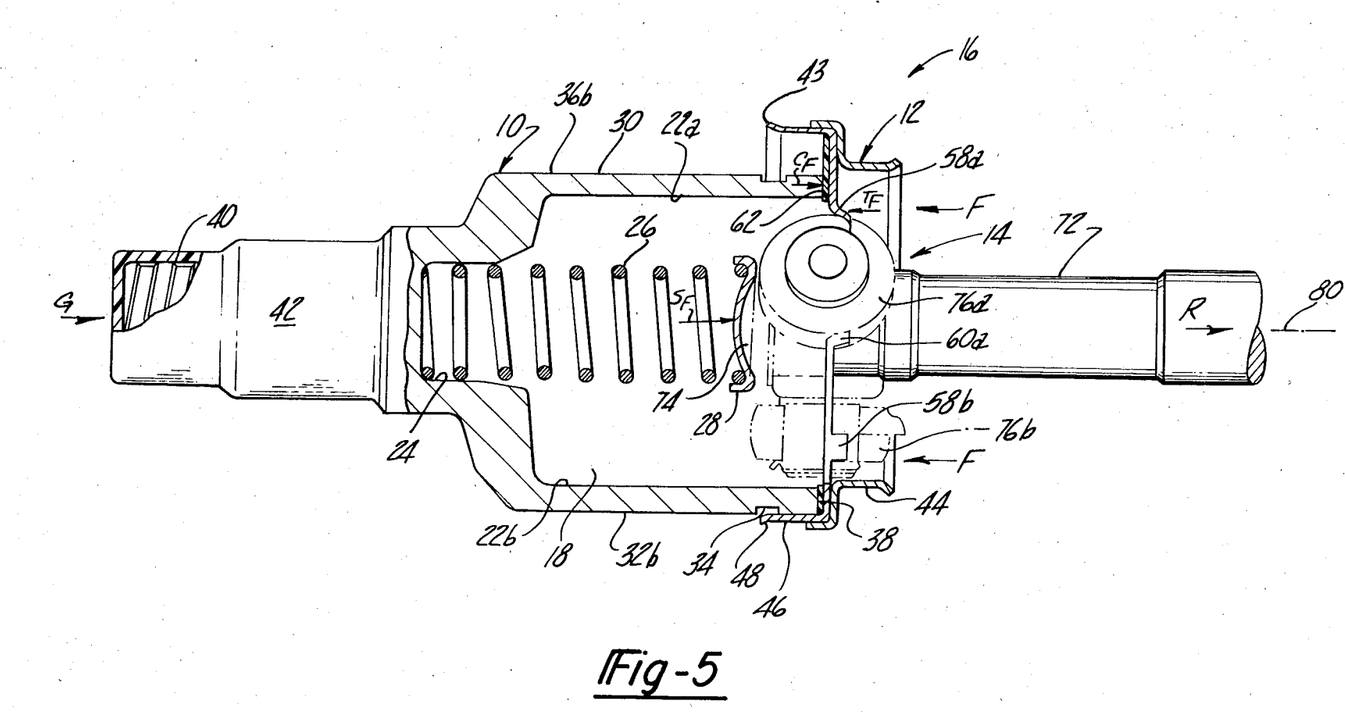
FIG. 5 is a side elevational view with parts cutaway of a closed tripod constant velocity joint assembly according to the present invention, the closed tripod constant joint being constructed from the tulip body of FIG. 1 and the spider assembly and tulip cover of FIG. 3.

Referring now to FIG. 5, the process of assembling the closed tripod constant velocity joint 16 from the tulip body 10, tulip cover 12, and the spider assembly 14 will be described. The spider assembly 14 is loosely preassembled to the tulip cover 12 in the manner illustrated in FIG. 3 by passing the end of the shaft 72 remote from the partial spherical portion 74 through the central aperture 52 of the tulip seal member 43. The tabs 58a, and 60a, and the tabs 58b and 60b, respectively, engage the rollers 76a and 76b of the spider assembly 14. The tabs 58c and 60c engage the third roller 76c, not illustrated, of the spider assembly 14. The tabs thereby align the tulip cover 12 relative to the spider assembly 14.

As illustrated in FIG. 5, the tulip cover 12 is advanced towards the tulip body 10 so as to bring the rollers 76a, 76b, and 76c into engagement with the tracks 22a, 22b, and 22c of the tulip body 10, as depicted in FIG. 5 for the rollers 76a and 76b. The tulip cover 10 is further advanced until the resilient seal member 62 is brought into engagement with the irregularly shaped annular surface 38 of the tulip body 10. In this position, the partial spherical portion 74 of the shaft 72 engages the spring cup 28 so that the coil spring 26 biases the spider assembly 14 away from the tulip body 10 and further biases the rollers 76a, 76b, and 76c into engagement with their respective tabs 58a and 60a, 58b and 60b, and 58c and 60c of the tulip cover 12.

An aligning force R is exerted on the end of the shaft 72 remote from the partial spherical portion 74 so as to provide an aligning force maintaining the spider assembly 14 in a properly aligned position relative to the tulip cover 12. A first interconnection force F is applied to the tulip cover 12, biasing the tulip cover 12 towards the tulip body 10. A second interconnection force G is applied to the protector 42 so as to bias the tulip body 10 towards the tulip cover 12.

An internal clamping force $C_F$ is thereby experienced by the resilient seal member 62, tending to resiliently deflect the resilient seal member. Similarly, a spring force $S_F$ is exerted by the spring on both the tulip body 10 and the shaft 72. Similarly, the tabs 58a, 58b, 58c, 60a, 60b, and 60c together experience a total force $T_F$ from the rollers 76a, 76b and 76c. It will be appreciated that the following relationships exist between these forces:

F is equal to G+R;
G is equal to $C_F+S_F$; and
R is equal to $T_F-S_F$.

The selection of the forces F, G, and R depends on the amount of spring force $S_F$ which arises from the total deflection of the coil spring 26 resulting from the positioning of the resilient seal member 62 adjacent the irregularly shaped annular surface 38. These forces are also limited by the minimum compression force $C_F$ required by the resilient seal member 62 in order to provide a good seal between the tulip cover 12 and the tulip body 10 and by the maximum force $T_F$ which the tabs may experience without being permanently deformed.

Figure 6:
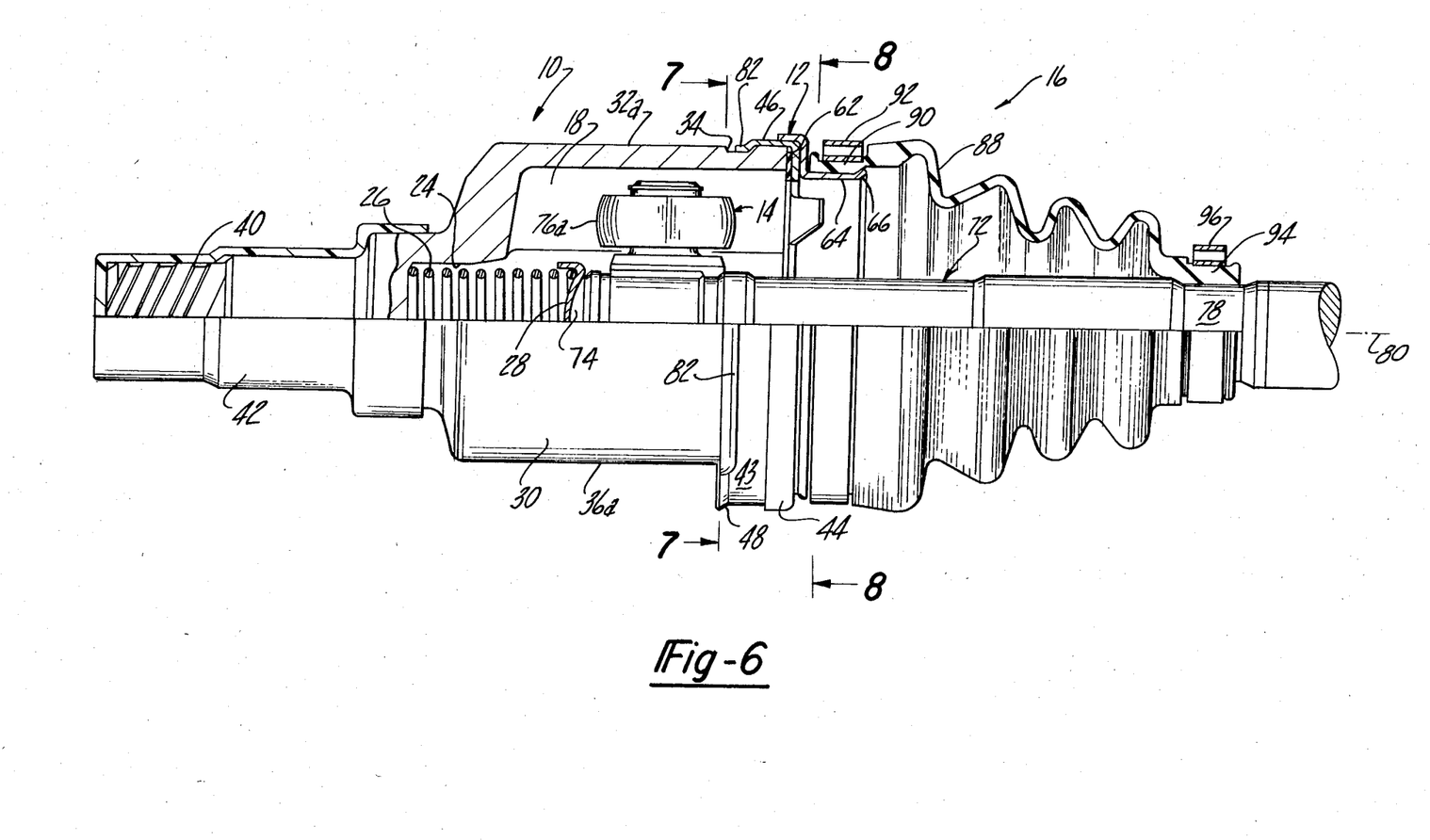
FIG. 6 is a partially cutaway side elevational view of the closed tripod constant velocity joint assembly of FIG. 5 after the tulip cover assembly has been permanently interconnected with the tulip body, the closed tripod constant velocity joint being shown with the coil spring thereof in a compressed condition.
Figures 7, 8:
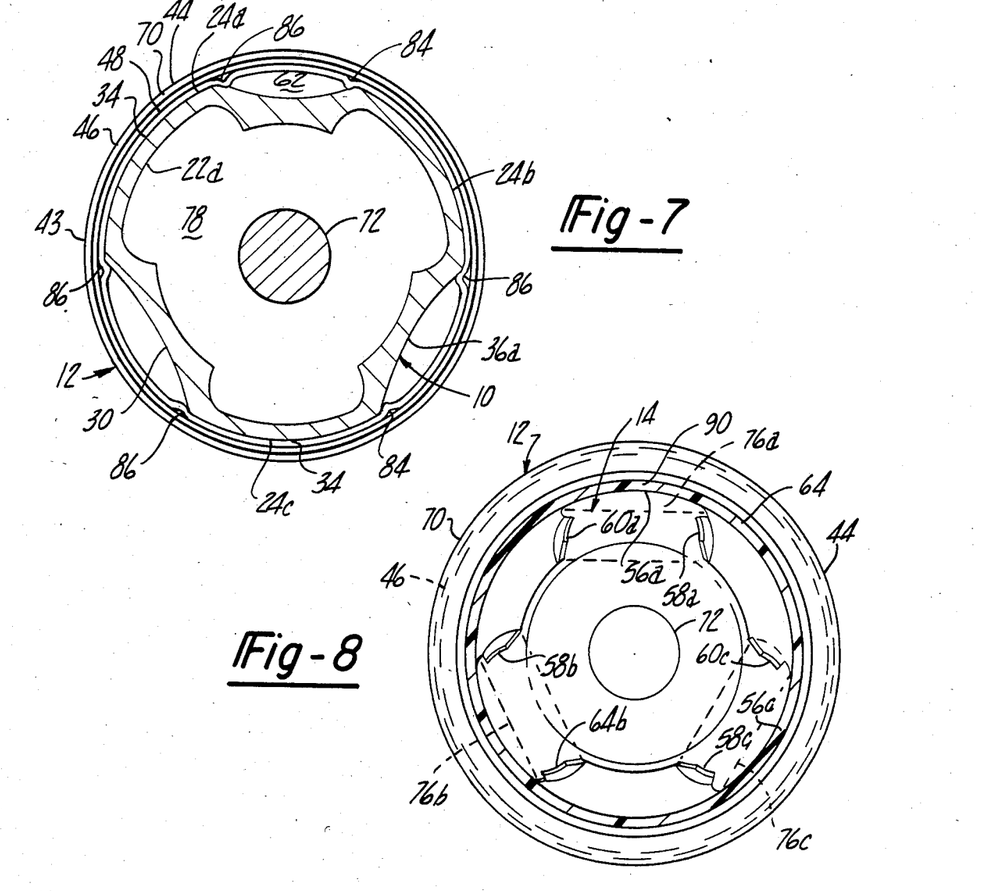
FIGS. 7 and 8 are sectional views, with parts removed, taken respectively along lines 7—7 and 8—8 of FIG. 6.

After the forces G, F and R have been applied, respectively, to the tulip body 10, the tulip cover 12, and the spider assembly 14, the tulip cover 12 may be permanently interconnected with the tulip body 10 in the manner illustrated in FIGS. 6 through 8. When the tulip cover 12 has been biased into engagement with the tulip body 10 in the manner described above, the first cylindrical flange 46 of the tulip seal member 43 surrounds the partial circular cylindrical surface portions 32a, 32b, and 32c of the outer surface 30 of the tulip body 10, as best illustrated in FIG. 7. The first cylindrical flange 46 may be permanently interconnected with the partial circular cylindrical surface portions 32a, 32b, and 32c by crimping, as shown at 82 in FIG. 6, a portion of the outwardly flared end 48 of the first cylindrical flange 46 extending one of the the partial annular recesses 34 of the outer surface 30 of the tulip body 10. Once the crimping operation is complete, the forces G, F, and R are no longer necessary to maintain the tulip body 10, the tulip cover 12, and the spider assembly 14 in an aligned condition. Furthermore, the resilient seal member 62 is permanently compressed, as shown in FIG. 6, between the inwardly oriented flange 50 of the tulip cover 12 and the irregularly shaped annular surface 38 of the tulip body 10 to form a permanent reliable seal therebetween, the resilient seal member continuing to experience the internal clamping force $C_F$.

The first cylindrical flange 46 of the tulip cover 12 may be further interconnected with the tulip body 10 by crimping portions 84 and 86, as shown in FIG. 7, of the first cylindrical flange 46 into engagement with portions of the concave surface portions 36a, 36b, and 36c of the outer surface 30 of the tulip body 10.

A boot 88 may now be assembled to the closed tripod constant velocity joint 16, as illustrated in FIG. 6. The boot is made of a flexible material having a generally circular cross-section. The boot 88 has a first circular end portion 90 which is resiliently mounted on the second cylindrical flange 64 of the boot seal member 44 of the tulip cover 12. A clamp 92 is fitted over the first circular end portion 90 so as to removably interconnect the boot 88 with the tulip cover 12 and form a reliable seal therebetween. The boot 88 is further provided with a second circular end portion 94 sealingly interconnected by means of a clamp 96 with the reduced diameter portion 78 of the shaft 72.

As described above and as best shown in FIG. 6, the second cylindrical flange 64 of the boot seal member 44 is preferably of a substantially smaller outer diameter than the maximum respective outer diameters of the tulip cover 12 and the tulip body 10. Thus, even the clamp 92 interconnecting the first circular end portion 90 of the boot 88 with the tulip cover 12 is recessed relative to the tulip cover 12. Therefore, when the closed tripod constant velocity joint 16 is placed on any surface, or when the closed tripod constant velocity joint is dropped, the boot 88 is unlikely to experience a substantial load and, therefore, is less likely to be damaged than the boots of prior art closed tripod constant velocity joints.

It will, therefore, be appreciated by those skilled in the art that the present invention provides a reliable and inexpensive self-aligning tripod joint tulip cover, as well as an inexpensive closed tripod constant velocity joint having a reliable seal. The assembly of the self-aligning tripod tulip joint cover of the present invention to a tulip body is facilitated by the self-aligning feature of the tripod joint tulip cover.

It will be appreciated by those skilled in the art that the above description is merely exemplary of the present invention, and that many modifications and variations may be made without departing from the spirit of the present invention. For example, the resilient seal member 62 could be formed from an applied sealing medium or a gasketed material and may or may not be permanently interconnected with the inwardly oriented flange 50 of the tulip cover 12 prior to assembly of the tulip cover 12 to the tulip body 10. These and many other modifications and variations from the above described detailed description are included within the intended scope of the claims appended hereto.

What is claimed is:

1. A self-aligning tulip cover for interconnecting and aligning a spider assembly, an irregularly shaped, non-circular tulip body, and a boot; said irregularly shaped, non-circular tulip body having an open cavity formed therein, an irregularly shaped, non-circular outer circumferential surface disposed about said open cavity, and a flat annular surface extending between said irregularly shaped, non-circular outer circumferential surface and said open cavity; said spider assembly having a portion selectively insertable in said open cavity; said boot further having an inner surface with a cylindrical end portion; said self-aligning tulip cover further comprising:

first flange means selectively engageable with said irregularly shaped, non-circular outer circumferential surface of said irregularly shaped, non-circular tulip body;

interconnection means selectively interconnecting said first flange means with said irregularly shaped, non-circular outer circumferential surface of said irregularly shaped, non-circular tulip body;

second flange means extending in a direction away from said first flange means, said second flange means in sealing engagement with said cylindrical end portion of said inner surface of said boot; and radially extending flange means interposed said first and second flange means, said radially extending flange means extending radially and being engageable with said flat annular surface of said irregularly shaped, non-circular tulip body, such as to form a seal therebetween when said first flange means is interconnected with said irregularly shaped, non-circular outer circumferential surface of said irregularly shaped, non-circular tulip body by said interconnection means, said radially extending flange means further being selectively engageable with said spider assembly, such as to retain said spider assembly in a preselected aligned orientation in said open cavity when said first flange means is interconnected with said irregularly shaped, non-circular outer circumferential surface of said irregularly shaped, non-circular tulip body by said interconnection means.

2. The self-aligning tulip cover of claim 1 further comprising means for sealing interposed said radially extending flange means and said flat annular surface.

3. The self-aligning tulip cover of claim 2 wherein said means for sealing comprises a flat resilient seal member, said flat resilient seal member being compressed between said radially extending flange means and said flat annular surface when said first flange means is interconnected with said irregularly shaped, non-circular outer circumferential surface of said irregularly shaped, non-circular tulip body by said interconnection means.

4. The self-aligning tulip cover of claim 1 wherein said irregularly shaped, non-circular outer circumferential surface of said irregularly shaped, non-circular tulip body comprises a plurality of partial circular cylindrical surface portions and a plurality of concave surface portions and further wherein said second flange means comprises a circular cylindrical flange selectively engageable with said plurality of partial circular cylindrical surface portions.

5. The self-aligning tulip cover of claim 4 wherein each of said plurality of partial circular cylindrical surface portions further comprises a partial annular groove, and wherein said interconnection means further comprises first portions of said first flange means being crimped into engagement with each said partial annular groove.

6. The self-aligning tulip cover of claim 5 wherein said interconnection means further comprises second portions of said first flange means being crimped into engagement with portions of said plurality of concave surface portions.

7. The self-aligning tulip cover of claim 1 wherein said irregularly shaped, non-circular outer circumferential surface of said irregularly shaped, non-circular tulip body comprises a partial annular groove, and further wherein said interconnection means further comprises portions of said first flange means being crimped into engagement with said partial annular groove.

8. The self-aligning tulip cover of claim 1 further comprising:
- a first member comprising said first flange means and said radially extending flange means;
- a second member comprising said second flange means and second radially extending flange means, said radially extending flange means extending radially outwardly of said second flange means; and
- second interconnection means interconnecting said radially extending flange means with said second radially extending flange means.

9. The self-aligning tulip cover of claim 8 wherein said second interconnection means comprises weld means.

10. The self-aligning tulip cover of claim 8 wherein each of said first and second members comprises a sheet metal stamping.

11. The self-aligning tulip cover of claim 1 wherein said radially extending flange means comprises a flat annular portion engageable with said flat annular surface of said irregularly shaped non-circular tulip body and a plurality of arcuate tab members extending angularly from said flat annular portion, said plurality of arcuate tab members being engageable with said spider assembly.

12. A self-aligning tulip cover for interconnecting and aligning an irregularly shaped, non-circular tulip body, a spider assembly, and a boot, said irregularly shaped, non-circular tulip body further comprising a first longitudinal axis; an open cavity extending along said first longitudinal axis; a plurality of tracks extending radially outwardly of said open cavity, said plurality of tracks being equally spaced circumferentially about said open cavity, each of said plurality of tracks extending parallel to said first longitudinal axis; cup means disposed in said open cavity; an irregularly shaped, non-circular outer circumferential surface, said irregularly shaped, non-circular outer circumferential surface having a plurality of partial circular cylindrical surface portions each disposed adjacent one of said plurality of tracks; a plurality of concave surface portions each interposed an adjacent pair of said plurality of partial circular cylindrical surface portions; and a flat annular surface extending between said irregularly shaped, non-circular outer circumferential surface and said open cavity; said spider assembly further comprising: a shaft having a second longitudinal axis, a first end, a second end, cup engaging means at said second end of said shaft, and a plurality of rollers rotatably interconnected with said second end of said shaft, such as to rotate about a plurality of axes equiangularly spaced about said second longitudinal axis, said plurality of rollers being engageable with said plurality of tracks; said cup engaging means being engageable with said cup means when said second end of said shaft is inserted into said open cavity; said boot further comprising an inner surface having a first end portion selectively interconnectable with said first end of said shaft and a second end portion disposed remote therefrom; said self-aligning tulip cover further comprising:
- a first partial circular cylindrical flange means selectively engageable with said plurality of partial circular cylindrical surface portions;
- first interconnection means selectively interconnecting said first partial circular cylindrical flange means with said irregularly shaped, non-circular outer circumferential surface of said irregularly shaped, non-circular tulip body such that said cup means engages said cup engaging means;
- a second circular cylindrical flange means selectively engageable with said second end portion of said inner surface of said boot, such as to form a seal therebetween, said second circular cylindrical flange means being concentric with said first partial circular cylindrical flange means and having a smaller diameter than said first partial circular cylindrical flange means, said second circular cylindrical flange means being oppositely oriented from said first partial circular cylindrical flange means;
- a first flat radial flange means interposed said first partial and said second circular cylindrical flange means, said first flat radial flange means extending radially inwardly, said first flat radial flange means being engageable with said flat annular surface of said irregularly shaped, non-circular tulip body when said first partial circular cylindrical flange means is interconnected with said irregularly shaped, non-circular outer circumferential surface of said irregularly shaped, non-circular tulip body by said first interconnection means;
- seal means interposed said first flat radial flange means and said flat annular surface; and
- a plurality of arcuate tab means extending angularly from said first flat radial flange means, said plurality of arcuate tab means being engageable with said plurality of rollers of said spider assembly when said first partial circular cylindrical flange means is interconnected with said irregularly shaped, non-circular outer circumferential surface of said irregularly shaped, non-circular tulip body of said first interconnection means, such as to selectively retain said spider assembly in a preselected aligned orientation in said open cavity.

13. The self-aligning tulip cover of claim 12 wherein said seal means comprises a flat resilient seal member, said flat resilient seal member being compressed between said first flat radial flange means and said flat annular surface when said first partial circular cylindrical flange means is interconnected with said irregularly shaped, non-circular outer circumferential surface of said irregularly shaped, non-circular tulip body by said first interconnection means.

14. The self-aligning tulip cover of claim 12 wherein each of said plurality of partial cylindrical surface portion further comprises a partial circular groove said first interconnection means comprising portions of said first partial circular cylindrical flange means being crimped into engagement with each said partial circular groove.

15. The self-aligning tulip cover of claim 12 further comprising:
- a first member comprising said first partial circular cylindrical flange means, said first flat radial flange means, and said plurality of arcuate tab members;
- a second member comprising said second circular cylindrical flange means and a second flat annular flange means extending radially outwardly from said second circular cylindrical flange means; and
- second interconnection means fixedly interconnecting said second circular cylindrical flange means with said second flat annular flange means.

16. A constant velocity joint comprising:
an irregularly shaped, non-circular tulip body;
an open cavity formed in said irregularly shaped, non-circular tulip body;

an irregularly shaped, non-circular outer circumferential surface for said irregularly shaped, non-circular tulip body disposed concentric with said open cavity;

a flat annular surface formed on said irregulary shaped, non-circular tulip body between said irregularly shaped, non-circular outer circumferential surface and said open cavity;

spider means having a first portion selectively insertable in said open cavity and a second portion remote from said first portion;

a boot;

an inner surface formed in said boot, said inner surface having a first end selectively interconnectable with said second portion of said spider means and a second end disposed adjacent said flat annular surface;

a tulip cover selectively mountable to said spider means adjacent said first portion thereof;

first flange means extending longitudinally from said tulip cover, said first flange means selectively engageable with said irregularly shaped, non-circular outer circumferential surface of said irregularly shaped, non-circular tulip body;

interconnection means formed integrally with said first flange means for selectively interconnecting said first flange means with said irregularly shaped, non-circular outer circumferential surface of said irregularly shaped, non-circular tulip body;

second flange means extending longitudinally from said tulip cover in a direction opposite said first flange means, said second flange means being in sealing engagement with said second end of said inner surface of said boot;

radially extending flange means extending radially inwardly from said tulip cover, said radially extending flange means being disposed between said first and second flange means, said radially extending flange means being engageable with said flat annular surface, such as to form a seal therebetween when said first flange means is interconnected with said irregularly shaped, non-circular outer circumferential surface of said irregularly shaped, non-circular tulip body by said interconnection means; and tab means extending from said radially extending flange means, such as to retain said first portion of said spider means in said open cavity when said first flange means is interconnected with said irregularly shaped, non-circular outer circumferential surface of said irregularly shaped, non-circular tulip body by said interconnection means.

17. The constant velocity joint of claim 16 further comprising flat resilient seal means positioned between said radially extending flange means and said flat annular surface of said irregularly shaped non-circular tulip body.

18. The constant velocity joint of claim 16 wherein said open cavity further comprises a bore and a plurality of tracks extending radially outwardly of said bore; and wherein said irregularly shaped, non-circular outer circumferential surface of said irregularly shaped, non-circular tuilp body further comprises a plurality of partial circular cylindrical surface portions and a plurality of concave surface portions each disposed adjacent one of said plurality of tracks; and further wherein said second flange means comprises a circular cylindrical flange selectively engageable with said plurality of partial circular cylindrical surface portions.

19. The constant velocity joint of claim 18 wherein each of said plurality of partial circular cylindrical surface portions further comprises a partial annular groove, said interconnection means comprising first portions of said first flange means being crimped into engagement with each said partial annular groove.

20. The constant velocity joint of claim 19 wherein said interconnection means further comprises second portions of said first flange means being crimped into engagement with portions of said plurality of concave surface portions.

21. The constant velocity joint of claim 16 wherein said irregularly shaped, non-circular outer circumferential surface of said irregularly shaped, non-circular tulip body comprises a partial annular groove, and further wherein said interconnection means further comprises portions of said flat flange means being crimped into engagement with said partial annular groove.

22. The constant velocity joint of claim 16 wherein said tulip cover further comprises:

a first member comprising said first flange means and said radially extending flange means;

a second member comprising said second flange means and second radially extending flange means, said second radially extending flange means extending radially outwardly of said second flange means; and second interconnection means interconnecting said radially extending flange means with said second radially extending flange means.

23. The constant velocity joint of claim 16 wherein:

said second portion of said spider means comprises a shaft;

said open cavity comprises a plurality of tracks extending radially outwardly of said open cavity, said plurality of tracks being equiangularly spaced about the longitudinal axis of said open cavity;

said first portion of said spider means comprises a plurality of rollers, said plurality of rollers being rotatably mounted to said shaft and spaced equiangularly thereabout such that each roller of said plurality of rollers is rotatably disposed in one track of said plurality of tracks with said first portion of said spider means disposed in said open cavity; and said second radially extending flange means engages each roller of said plurality of rollers when said tulip cover is interconnected with said irregularly shaped non-circular tulip body by said interconnection means.

24. The constant velocity joint of claim 23 wherein said second radially extending flange means comprises a plurality of arcuate tab members extending angularly from said second radially extending flange means, said plurality of arcuate tab members being engageable with said plurality of rollers.

* * * * *

UNITED STATES PATENT AND TRADEMARK OFFICE
CERTIFICATE OF CORRECTION

PATENT NO. : 4,605,384

DATED : August 12, 1986

INVENTOR(S) : Patrick L. Kurzeja, et al.

It is certified that error appears in the above-identified patent and that said Letters Patent is hereby corrected as shown below:

Column 4, line 23, delete "consists of" and insert ---- has ----.

Column 5, line 46, delete "detail greater" and insert ---- greater detail ----.

Column 6, line 54, after "extending" insert ---- into ----.

In the Claims

Column 10, line 33, delete "of" and insert ---- by ----.

Column 10, line 48, after "groove" insert a comma ---- , ----.

Column 11, line 21, after "means" insert ---- being ----.

Column 12, line 23, delete "flat" and insert ---- first ----.

Signed and Sealed this

Tenth Day of February, 1987

*Attest:*

DONALD J. QUIGG

*Attesting Officer*  *Commissioner of Patents and Trademarks*